United States Patent

Enoki et al.

[11] Patent Number: 4,696,364
[45] Date of Patent: Sep. 29, 1987

[54] POWER-UNIT SUPPORT STRUCTURE OF MOTORCYCLE

[75] Inventors: Shigenaga Enoki; Kazuya Yoshio; Nobuo Yamaguchi, all of Asaka, Japan

[73] Assignee: Honda Giken Kogyo Kabushiki Kaisha, Tokyo, Japan

[21] Appl. No.: 782,106

[22] Filed: Sep. 30, 1985

[30] Foreign Application Priority Data

Dec. 26, 1984 [JP] Japan .................... 59-278772

[51] Int. Cl.$^4$ ............................. B60K 5/12
[52] U.S. Cl. .................... 180/228; 180/291; 248/567
[58] Field of Search ............... 180/227, 228, 291, 299, 180/295, 312; 248/564, 567, 589, 592, 596, 611

[56] References Cited

U.S. PATENT DOCUMENTS

| | | | |
|---|---|---|---|
| 4,324,306 | 4/1982 | Ishihara et al. | 180/228 |
| 4,373,602 | 2/1983 | Tomita et al. | 180/228 |
| 4,487,285 | 12/1984 | Tomita et al. | 180/228 |

Primary Examiner—John J. Love
Assistant Examiner—Richard Lamb
Attorney, Agent, or Firm—Birch, Stewart, Kolasch & Birch

[57] ABSTRACT

A power-unit support structure of a motorcycle having a power unit and a frame structure including a tubular member having a hollow rear end portion, comprising a rigid bracket member secured to the tubular member and positioned in the vicinity of the rear end portion of the tubular member, a first pivot assembly positioned between the power unit and the tubular member and pivotally movable about an axis fixed with respect to the frame structure, a second pivot assembly mounted on the power unit and pivotally movable about an axis fixed with respect to the frame structure and parallel with the axis of pivotal motion of the first pivot assembly, rigid connecting members providing connection between the first and second pivot assemblies, a damper assembly rigidly connected to the first pivot assembly and elastically engaging the rear end portion of the tubular member. Such a the damper assembly includes an arm member rigidly connected at one end to the first pivot assembly and terminating in conjunction with the rear end portion of the tubular member and an elastic damper element engaging the rear end portion of the tubular member, the arm member being coupled at the other end to the elastic damper element.

13 Claims, 10 Drawing Figures

POWER-UNIT SUPPORT STRUCTURE OF MOTORCYCLE

FIELD OF THE INVENTION

The present invention relates to a motorcycle and, more particularly, to a power-unit support structure for use in a motorcycle such as a power-driven bicycle, a scooter or a power-driven tricycle.

BACKGROUND OF THE INVENTION

An existing motorcycle has a power unit mounted on the frame structure of the vehicle by means of a swing-arm support structure. With such a support structure, the power unit which consists of an engine and a power transmission mechanism is suspended from the frame structure of the vehicle in such a manner as to form part of a swing-arm structure which is swingable with respect to the frame structure. The swing-arm power-unit support structure includes a suspension assembly which intervenes between the power unit and the rearmost end of a downtube which forms part of the frame structure of the vehicle. The suspension assembly includes a rigid link member pivotally coupled at one end to the power unit and at the other to the downtube with an elastic damper element interposed between the rear end of the downtube and the link member. The link member has upper and lower projections at its end connected to the downtube.

The power unit supported by means of such a suspension assembly is subjected not only to impacts transferred from the road wheels through the frame structure but also to vibrations created in the power unit per se. The impacts transferred through the frame structure cause the power unit to oscillate vertically with respect to the frame structure and the vibrations originating in the power unit tend to be transmitted through the link member to the downtube. The oscillatory motions of the front end portions of the power unit cause the link member to rock vertically with respect to the downtube. Under such conditions, the elastic damper element provided between the downtube and the link member attenuates such oscilatory motions of the power unit and absorbs the vibrations to be transmitted through the link member to the downtube. As a result of the rocking motions of the link member, the elastic damper element is subjected to compressive forces alternately applied from the upper and lower projections of the link member. In this instance, the distance between the axis about which the link member is caused to rock and the area in which the compressive forces are concentrated in the elastic damper elements is limited by the diameter of the downtube as will be discussed in more detail. To enable the elastic damper element to attenuate the oscillating motions of the link member satisfactorily, the elastic damper element is required to provide a relatively large spring constant. Such a damper element is however not adapted to dampen the vibrations originating in the power unit per se and, thus, the vibrations created in the power unit are allowed to transmit through the elastic damper element to the frame structure of the motorcycle in a significant proportion.

It is, accordingly, a prime object of the present invention to provide an improved motorcycle power-unit support structure which is capable of not only attenuating the oscillatory motions of the power unit but absorbing the vibrations which originate in the power unit per se.

SUMMARY OF THE INVENTION

In accordance with the present invention, there is provided a power-unit support structure of a motorcycle having a power unit and a frame structure including a support member having a rear end portion terminating in conjunction with the power unit, comprising a rigid bracket member secured to the support member and positioned rearwardly of the support member; a pivot assembly positioned between the power unit and the rear end portion of the support member and pivotally movable about an axis substantially fixed with respect to the frame structure; rigid connecting means providing connection between the pivot assembly and the power unit; damper means rigidly connected to the pivot assembly and elastically engaging the rear end portion of the support member, the damper means including a rigid arm member rigidly connected at one end thereof to the pivot assembly and terminating in conjunction with the rear end portion of the support member and an elastic damper element engaging the rear end portion of the support member, the arm member being coupled at the other end thereof to the elastic damper element. The aforesaid pivot assembly constituting a first pivot assembly, the support structure may further comprise a second pivot assembly mounted on the power unit and pivotally movable about an axis substantially fixed with respect to the frame structure and substantially parallel with the axis of pivotal motion of the first pivot assembly, the rigid connecting means providing connection between the first and second pivot assemblies.

BRIEF DESCRIPTION OF THE DRAWINGS

The drawbacks of a prior-art motorcycle power-unit support structure and the features and advantages of a power-unit support structure according to the present invention will be more clearly appreciated from the following description taken in conjunction with the accompanying drawings in which:

FIGS. 5A to 5B are views showing the configuration of an elastic damper element included in the power-unit support structure illustrated in FIGS. 2 and 3, wherein FIG. 5A is a top plan view of the damper element, FIG. 5B is a side elevation view of the damper element as viewed from a vertical plane indicated by line B—B in FIG. 5A, FIG. 5C is a horizontal sectional view taken on a plane indicated by line D—D in FIG. 5C;

FURTHER DESCRIPTION OF THE PRIOR ART

Figure 1:
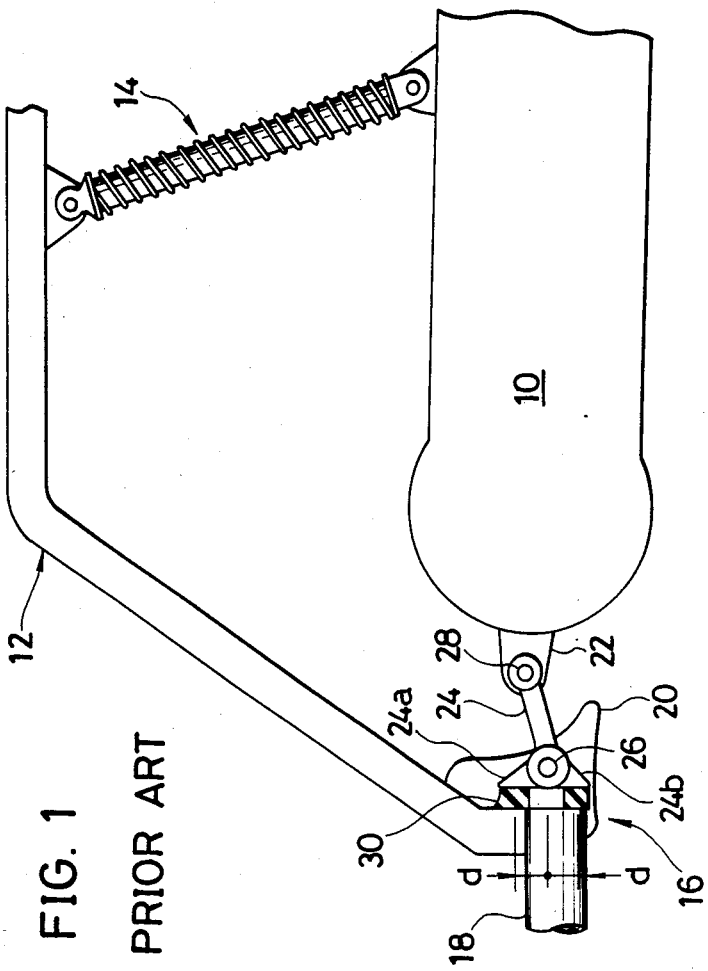
FIG. 1 is a side elevation view of a representative example of a known power-unit support structure for a motorcycle.

Description will be further made regarding a known swing-arm power-unit support structure of a motorcycle. In FIG. 1 of the drawings is shown an example of such a power-unit support structure, wherein the power unit consisting of an internal combustion engine and a power transmission mechanism is generally indicated at 10. As shown, the power unit 10 is suspended from the frame structure 12 of the motorcycle by means of a spring damper cylinder 14 and a front suspension assembly 16. The spring damper cylinder 14 is connected at one end to a lengthwise middle portion or a rear end portion of the power unit 10 and at the other to a horizontally extending rear end portion of the frame structure 12. The front suspension assembly 16 intervenes between the foremost end of the power unit 10 and the rearmost end of a hollow downtube 18 which forms part of the frame structure 12. The downtube 18 has securely attached thereto a rigid front bracket member 20 and, likewise, the power unit 10 has a rigid rear bracket member 22 located at the foremost end of the power unit in conjunction with the bracket member 20 on the downtube 18. A rigid link member 24 is pivotally coupled at one end to the front bracket member 20 by a pivot pin 26 and at the other to the rear bracket member 22 by a pivot pin 28. The link member 24 has upper and lower projections 24a and 24b at its end connected to the front bracket member 20. The upper and lower projections 24a and 24b protrude in diametrically opposite directions away from the pivot pin 26 on the front bracket member 20. An elastic damper element 30 interposed between the rear end of the downtube 18 and these projections 24a and 24b of the link member 24. The elastic damper element 30 is constructed typically of rubber.

During running of the motorcycle with the power unit 10 in operation, the power unit 10 is subjected to impacts transferred from the road wheels through the frame structure 12 and vibrations created in the power unit per se. The impacts transferred through the frame structure 12 to the power unit 10 cause a front end portion of the power unit 10 to oscillate vertically with respect to the frame structure 12, while the vibrations originating in the power unit 10 are transmitted through the link member 24 to the front bracket member 20. The oscillatory motions of the front end portions of the power unit 10 in turn cause the link member 24 to rock vertically about the center axis of the pivot pin 26 on the front bracket member 20. The elastic damper element 30 provided between the downtube 18 and the link member 24 of the front suspension assembly 16 as described above serves to attenuate such oscillatory motions of the front end portion of the power unit 10 and to absorb the vibrations to be transmitted through the link member 24 to the downtube 18.

The rocking motions of the link member 24 about the center axis of the pivot pin 26 result in rocking motions of the upper and lower projections 24a and 24b of the link member 24. The elastic damper element 30 is thus subjected to compressive forces alternately from the upper and lower projections 24a and 24b of the link member 24 as the link member 24 is caused to rock about the center axis of the pivot pin 26 on the front bracket member 20. These compressive forces produced in the elastic damper element 30 are concentrated in an annular area aligned with the circular rear end edge of the downtube 18 against which the damper element 30 is pressed. The distance d between such an area and the center axis of the pivot pin 26 about which the link member 24 is caused to rock as above discussed is limited by the diameter of the downtube 18. The upper and lower projections 24a and 24b of the link member 24 are for this reason permitted to rock with respect to the frame structure 12 through angles limited by the diameter of the downtube 18. To provide desired oscillation damping characteristics with use of such a suspension assembly 16, it is thus required to use a relatively hard elastic material for the elastic damper element 30 to provide a relatively large spring constant (load rate). The elastic damper element 30 having such a large spring constant is however inappropriate for the attenuation of the vibrations originating in the power unit 10 per se. It is for this reason practically inevitable in the suspension assembly 16 of the described construction that the vibrations created in the power unit 10 be allowed to transmit through the elastic damper element 30 to the frame structure 12 of the motorcycle. The present invention contemplates elimination of such a drawback of a prior-art support structure for the power unit of a motorcycle.

DESCRIPTION OF THE PREFERRED EMBODIMENTS

Description will be hereinafter made regarding the construction and arrangement of preferred embodiments of a power-unit support structure according to the present invention. For purposes of description, it will be assumed that a power-unit support structure according to the present invention is embodied in a scooter illustrated in FIG. 2.

Figure 2:
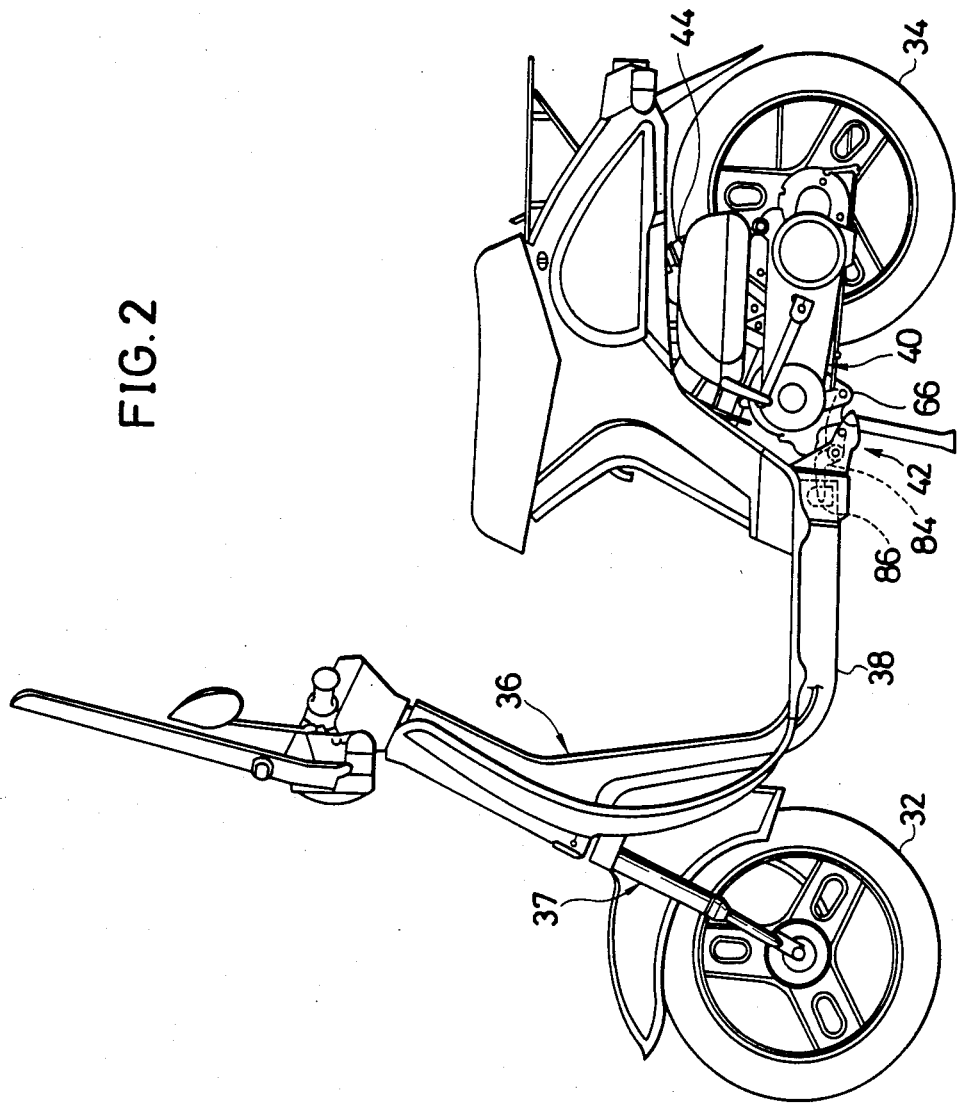
FIG. 2 is a side elevation view of a motorcycle having incorporated therein a power-unit support structure embodying the present invention.

As shown in FIG. 2, the scooter incorporating the power-unit support structure embodying the present invention has a steering front road wheel 32 and a driving rear road wheel 34. The front and rear road wheels 32 and 34 are connected together by means of a frame structure 36 coupled to a front fork structure 37 carrying the front road wheel 32. The frame structure 36 includes a hollow tubular member 38 having a lower rear end portion horizontally extending away from the front road wheel 32 toward the rear road wheel 34. The hollow tubular member 18 is herein called downtube and is assumed to have a circular cross section and has its rear end located in front of a power unit which is generally indicated at 40. The power unit 40 consists of an internal combustion engine and a power transmission mechanism which operatively connects the engine to the driving rear road wheel 34 as is well known in the art. A first preferred embodiment of a power-unit support structure according to the present invention, as indicated generally at 42, is adapted to have such a power unit 40 suspended from the frame structure 36 and may be provided in combination with a spring damper cylinder which is partly seen at 44 in FIG. 2. As discussed in connection with the prior-art power-unit support structure illustrated in FIG. 1, the spring damper cylinder 44 is connected at one end to a lengthwise middle portion or a rear end portion of the power unit 40 and at the other to a horizontally extending rear end portion of the frame structure 36. The construction and arrangement of such a spring damper cylinder 44 is well known in the art and is rather immaterial to the understanding of the subject matter of the present invention and, for these reasons, will not be herein described in more detail.

The power-unit support structure 42 embodying the present invention thus intervenes between the foremost end of the power unit 40 and the rearmost end of the downtube 46 and comprises a pair of rigid bracket members 46 and 46' which are welded or otherwise securely attached to a rear end portion of the downtube 38. The bracket members 46 and 46' are spaced apart in parallel from each other laterally of the frame structure 36 (FIG. 2) of the vehicle in front of the power unit 40. These bracket members 46 and 46' may be constructed separately of each other or, otherwise, may form part of a unitary rigid structure secured to the downtube 38. If desired, furthermore, the bracket members 46 and 46' may be combined with rigid reinforcement members 48 and 48' which are also welded or otherwise securely attached to the rear end portion of the downtube 38. These reinforcement members 48 and 48' may also be constructed separately of each other and respectively connected to the bracket members 46 and 46' or otherwise may form part of a unitary rigid structure secured to the downtube 38.

Figure 3:
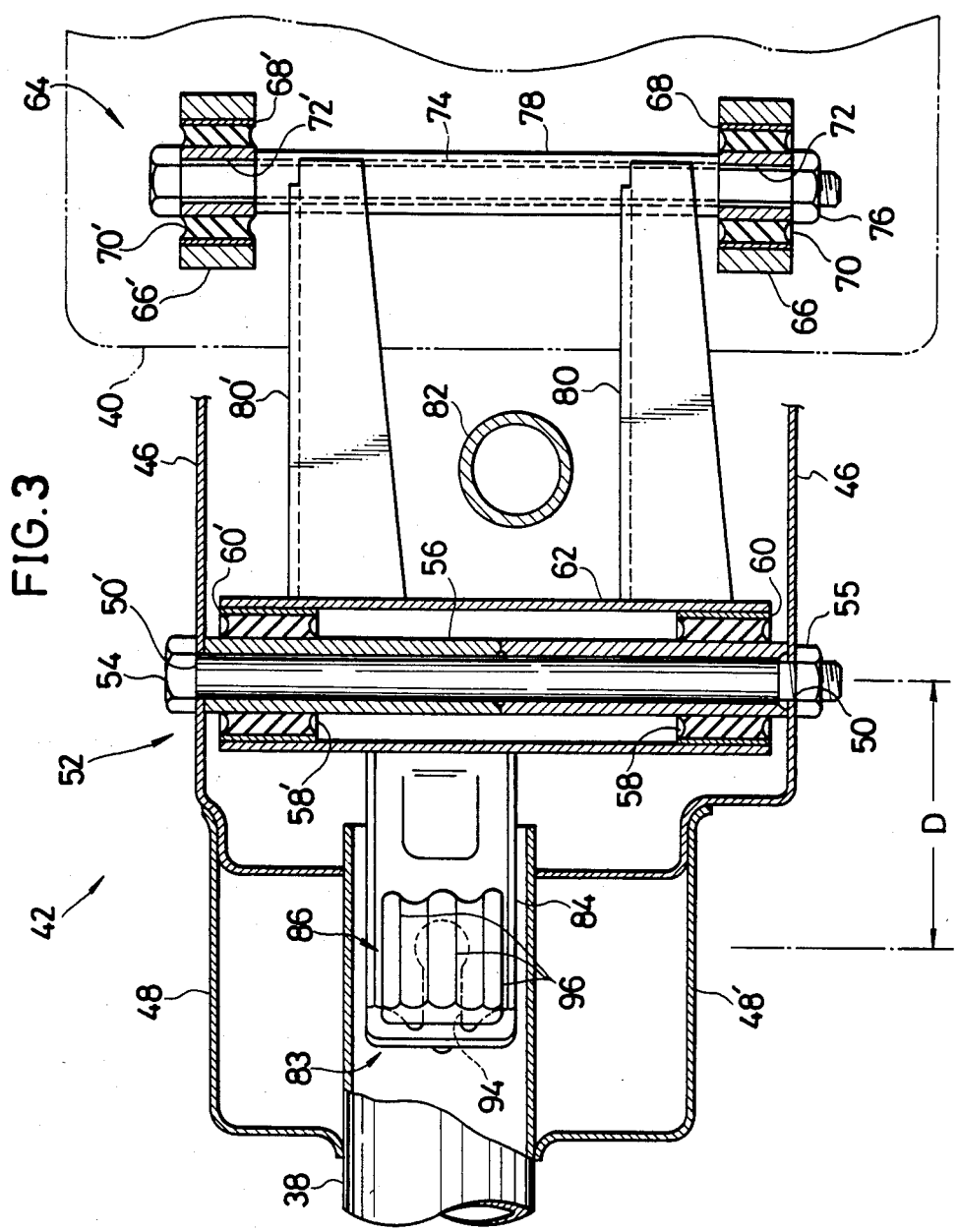
FIG. 3 is a horizontal sectional view showing, to an enlarged scale, a first preferred embodiment of a power-unit support structure according to the present invention.

The bracket members 46 and 46' are formed with circular openings 50 and 50', respectively, which are aligned with each other laterally of the frame structure 36 of the vehicle. The openings 50 and 50' thus formed in the bracket members 46 and 46' are provided to have a first pivotal damper assembly 52 connected to the downtube 38 through the bracket members 46 and 46' and pivotally movable with respect to the frame structure 36 of the vehicle about an axis in a lateral direction of the frame structure 36. In the embodiment of the present invention as shown in FIG. 3, the first pivotal damper assembly 52 comprises a rigid elongated member constituted by a bolt 54 which has a head portion and a threaded end portion respectively at the opposite ends thereof and a stem portion which extends between these head and threaded end portions. The bolt 54 is passed through the openings 50 and 50' with its stem portion extending between the bracket members 46 and 46' and is fastened to the bracket members with its head portion forced against the outer face of one bracket member 46 and with a nut 55 tightened to the threaded end portion of the bolt 52 and forced against the outer face of the other bracket member 46'. The bolt 54 thus arranged extends horizontally in a lateral direction of the frame structure 36 of the vehicle and has its stem portion located immediately at the rear of the downtube 38 as shown. The stem portion of the bolt 54 is coaxially received in a rigid inner tubular member constituted by an inner sleeve member 56. The inner sleeve member 56 extends between the bracket members 46 and 46' with its opposite end faces held in contact with the inner faces of the bracket members 46 and 46', respectively. The inner sleeve member 56 in turn is coaxially received in a pair of cylindrical elastic damper elements constituted by rubber bushings 58 and 58' which are located on opposite end portions, respectively, of the inner sleeve member 56 and which are slightly spaced apart from the inner faces of the bracket members 46 and 46', respectively. The rubber bushings 58 and 58' are closely fitted in rigid hollow cylindrical members constituted by metal collars 60 and 60', respectively. The metal collars 60 and 60', in turn, are coaxially received jointly in a rigid outer tubular member constituted by an inner sleeve member 62. The outer sleeve member 62 extends between the bracket members 46 and 46' with its opposite end faces slightly spaced apart from the inner faces of the bracket members 46 and 46', respectively, as shown. The rear end portion of the downtube 38 is rearwardly open immediately in front of a lengthwise middle portion of the outer sleeve member 62 of the first pivot assembly 52 thus constructed and arranged.

The power-unit support structure 42 embodying the present invention further comprises a second pivot assembly 64 connected to the the power unit 40 and pivotally movable with respect to the frame structure 36 of the vehicle about an axis also in a lateral direction of the frame structure 36. The second pivot assembly 64 is coupled to the power unit 40 through a pair of bracket members 66 and 66' securely attached to the body structure of the power unit 40 and formed with axial bores aligned with each other in a direction parallel with the first pivot assembly 52 and each having a circular cross section. In the embodiment of the present invention as shown in FIG. 3, the second pivot assembly 64 comprises a pair of outer rigid hollow cylindrical members constituted by metal collars 68 and 68' coaxially received in the axial bores in the bracket members 66 and 66', respectively. These outer metal collars 68 and 68' in turn have coaxially received therein cylindrical elastic damper elements constituted by rubber bushings 70 and 70'. These rubber bushings 70 and 70' in turn have coaxially received therein rigid inner cylindrical members constituted by inner metal collars 72 and 72', respectively. The second pivot assembly 64 further comprises a rigid elongated member constituted by a bolt 74 which has a head portion and a threaded end portion respectively at the opposite ends thereof and a stem portion extending between these head and threaded end portions. The inner metal collars 72 and 72' are located around opposite end portions, respectively, of the stem portion of this bolt 74. The bolt 74 is passed through the axial bores in the inner collars 72 and 72' with its head portion forced against the outer end face of one inner metal collar 72 and with a nut 76 tightened to the threaded end portion of the bolt 74 and forced against the outer end face of the other inner metal collar 72'. The bolt 54 thus arranged extends horizontally in a lateral direction of the frame structure 36 of the vehicle and has its stem portion in parallel with the stem portion of the bolt 54 of the first pivot assembly 52. A rigid tubular member constituted by a sleeve member 78 is loosely received coaxially on the stem portion of the bolt 74 and extends between the inner metal collars 72 and 72' with its opposite end faces held in contact with the inner end faces of the collars 72 and 72', respectively, as shown.

The power-unit support structure 42 embodying the present invention further comprises a pair of rigid link members 80 and 80' extending between the first and second pivot assemblies 52 and 64 and spaced apart in parallel from each other laterally of the frame structure 36 of the vehicle. Each of the rigid link members 80 and 80' is welded or otherwise securely coupled at one end to the outer sleeve member 62 of the first pivot assembly 52 and at the other to the sleeve member 78 of the second pivot assembly 64. These rigid link members 80 and 80' may be arranged so that the exhaust pipe which leads from the power unit 40 as indicated at 82 in FIG. 2 vertically extends between the link members 80 and 80'.

Figure 4:
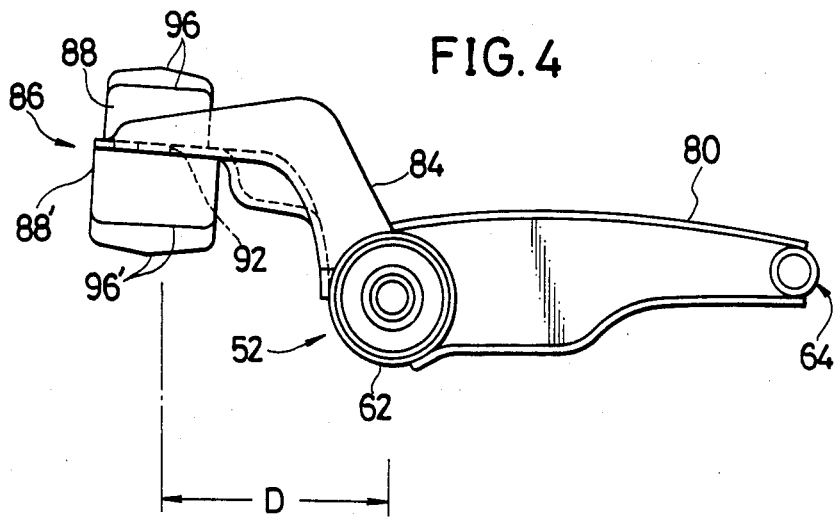
FIG. 4 is a side elevation view of the power-unit support structure illustrated in FIG. 3.
Figure 5A:
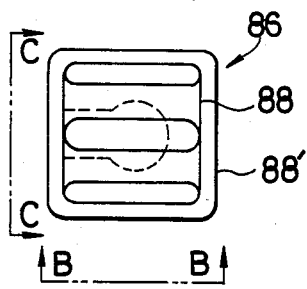

As will be also seen from FIG. 4 of the drawings, the power-unit support structure 42 embodying the present invention further comprises a damper assembly 83 providing engagement between the first pivot assembly 52 and the downtube 38. Such a damper assembly 83 is positioned within a rear end portion of the downtube 38 and comprises a rigid arm member 84 which is welded or otherwise securely connected at one end to the outer sleeve member 62 of the first pivot assembly 52. The arm member 84 extends forwardly and upwardly from the first pivot assembly 52 and then forwardly and horizontally into the rear end portion of the downtube 38. The arm member 84 has its leading end thus located within the read end portion of the downtube 38 and has an elastic damper element 86 fitted to its leading end portion. As will be better seen from FIGS. 5A, 5B and 5C of the drawings, the elastic damper element 86 comprises two, upper and lower lug portions 88 and 88' slightly spaced apart vertically from each other with a gap 90 formed therebetween and an intermediate portion 92 which conjoins the lug portions 88 and 88' together. The intermediate portion 92 has a cross section having a circular portion and a rectangular portion merging out of the circuit portion as will be seen from FIG. 5D. As indicated by broken lines in FIG. 3, the arm member 84 is formed with a recess or cutout 94 shaped conformingly to such a cross section of the intermediate portion 92 and the elastic damper element 86 is fitted to the leading end portion of the arm member 84 with the intermediate portion 92 of the former closely received in this cutout 94 in the latter.

Figure 5B:
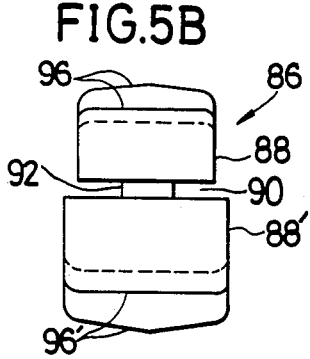
Figure 5C:
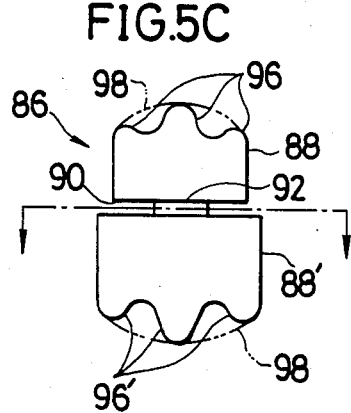
FIG. 5C is a front elevation view of the damper element as viewed from a vertical plane indicated by line C—C in FIG. 5A.
Figure 5D:
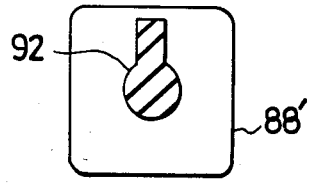

Each of the upper and lower lug portions 88 and 88' of the elastic damper element 86 is formed with a plurality of rib portions spaced apart in parallel from each other laterally of the frame structure 36 of the vehicle and each extending in a fore-and-aft direction of the frame structure 36. In FIGS. 5B and 5C, these rib portions are indicated at 96 for the rib portions of the upper lug portion 88 and at 96' for the rib portions of the lower lug portion 88'. The rib portions 96 of the upper lug portion 88 protrude upwardly away from the gap 90 and, likewise, the rib portions 96' of the lower lug portion 88' protrude downwardly away from the gap 90. These rib portions 96 and 96' of the elastic damper element 86 have their tops located on a cylindrical plane 98 having a center axis coincident with the center axis of the rear end portion of the downtube 38. Such a cylindrical plane 98 has a predetermined diameter which may be slightly larger than the inside diameter of the rear end portion of the downtube 38. The rib portions 96 and 96' of the elastic damper element 86 are thus elastically pressed at their tops on the inner peripheral surface of the rear end portion of the downtube 38.

The construction of the power-unit support structure 42 as above described is advantageous in that the distance (represented by D in FIG. 3) between the center axis, viz, the axis of pivotal motion of the first pivot assembly 52 and the center point of the pressure to act on the elastic damper element 86 from the arm member 84 can be selected arbitrarily by selecting the length of the arm member 84.

While each of the lug portions 88 and 88' is shown formed with three rib portions, each lug portion of the elastic damper element 86 may be modified in configuration to have only two or more than three rib portions which may be common in number to both of the two lug portions or which may differ in number from one lug portion to the other. If desired, only the upper lug portion 88 of the 86 may be formed with the ribs 96 with the the lower lug portion 88' shaped to have its lower face arcuately curved in cross section on the above mentioned cylindrical plane 98. Such a configuration of the lower lug portion 88' is preferred to add to the spring constant of the lower lug portion 88' which is to be subjected to greater downward loads than the upwardly directed loads to be applied to the upper lug portion 88.

Figure 6:
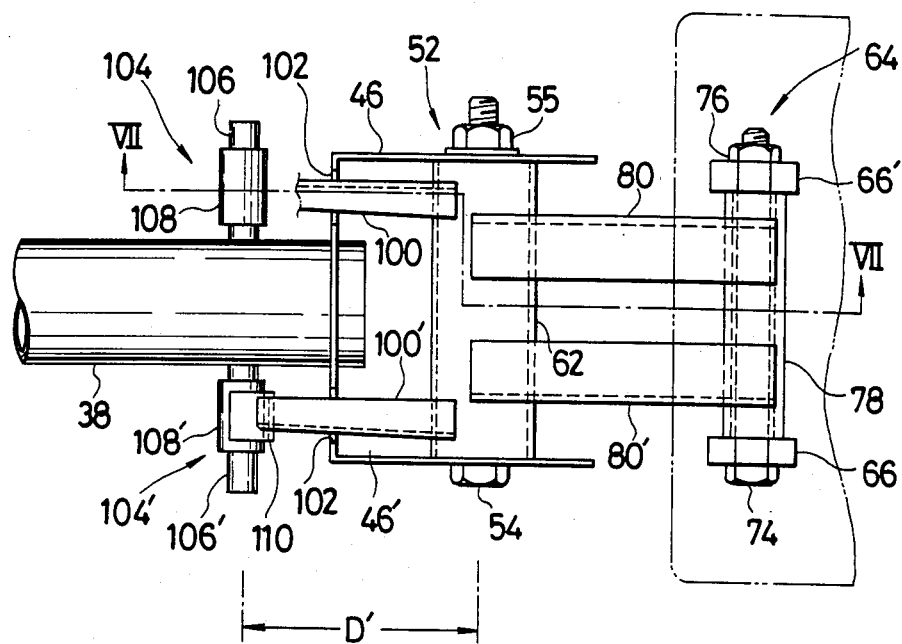
FIG. 6 is a horizontal top plan view showing a second preferred embodiment of a power-unit support structure according to the present invention.
Figure 7:
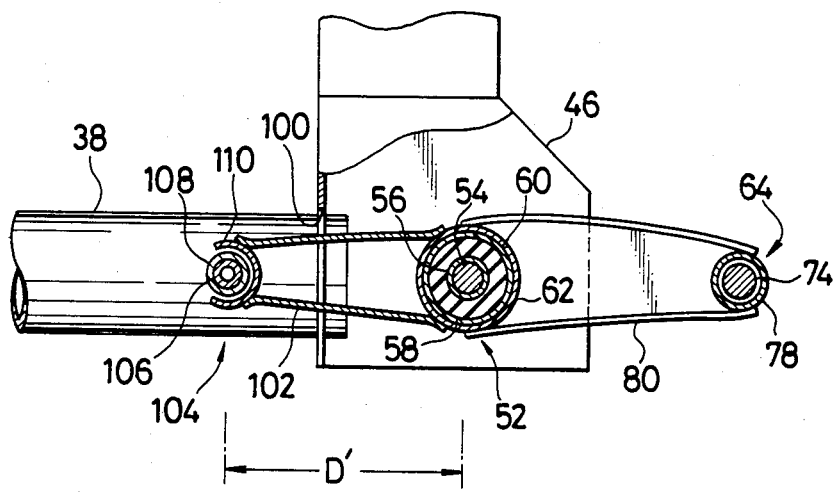
FIG. 7 is a cross sectional view taken on vertical planes indicated by lines VII—VII in FIG. 6.

FIGS. 6 and 7 of the drawings show a second preferred embodiment of a power-unit support structure according to the present invention. The embodiment herein shown is a modification of the embodiment hereinbefore described and is assumed to comprise all the component members and elements of the first embodiment except for the single arm member 84 and the elastic damper element 86 attached thereto. Thus, the embodiment shown in FIGS. 6 and 7 comprises first and second pivot assemblies 52 and 64 and link members 80 and 80' which are entirely similar to their respective counterparts in the embodiment hereinbefore described.

In the embodiment shown in FIGS. 6 and 7, there are provided in addition to such pivot assemblies 52 and 64 and link members 80 and 80' a pair of rigid arm members 100 and 100' each coupled at one end to the outer sleeve member 62 of the first pivot assembly 52. These arm members 100 and 100' are spaced apart in parallel laterally of the frame structure 36 (FIG. 2) of the vehicle and extend forwardly from the first pivot assembly 52 through openings 102 and 102', respectively, provided in a vertical wall member interconnecting the bracket members 46 and 46' secured to the downtube 38. The arm members 100 and 100' have leading end portions extending in parallel with and on both sides of a rear end portion of the downtube 38.

The power-unit support structure shown in FIGS. 6 and 7 further comprises a pair of damper assemblies 104 and 104' providing elastic connections from the arm members 100 and 100' to the downtube 38. These damper assemblies 104 and 104' comprise rigid cantilever shafts 106 and 106', respectively, projecting in opposite directions at right angles from the rear end portion of the downtube 38 in a lateral direction of the frame structure 36. The two cantilever shafts 106 and 106' have coaxially received thereon cylindrical elastic damper elements 108 and 108', respectively. Each of these elastic damper elements 108 and 108' is coaxially received in a generally semicylindrical sleeve member 110 which has an axial slot extending throughout the length of the sleeve member 110. The axial slot thus formed in each sleeve member 110 is open forwardly, viz., in a direction opposite to the first pivot assembly 52 as will be better seen from FIG. 7 so that the sleeve member 110, which is preferably constructed of spring steel, has its axial edge portions vertically deformable toward and away from each other. Each of the above described arm members 100 and 100' forwardly terminate close to each of the cantilever shafts 106 and 106' and is securely connected at its leading end to the sleeve member 110 thus forming part of each of the damper assemblies 104 and 104'.

The power-unit support structure thus constructed is also advantageous in that the distance (represented by D') between the axis of pivotal motion of the first pivot assembly 52 and the center point of the pressure to act on the elastic damper element 110 from each of the arm members 100 and 100' can be selected arbitrarily by selecting the length of each arm member. The embodiment of FIGS. 6 and 7 is further advantageous in that the two damper assemblies 104 and 104' positioned outside the downtube 38 provide easy access thereto during assemblage and servicing of the power-unit support structure.

As will be understood from the foregoing description, each of the embodiments of a power-unit support structure according to the present invention as an advantage that the distance between the axis of pivotal motion of the first pivot assembly and the center point of the pressure to act on the elastic damper element or each of the elastic damper elements from the arm member forming part of the damper assembly can be selected to have a sufficiently large value. To provide desired oscillation damping characteristics with use of such a power-unit support structure, it is thus allowed to use a relatively soft elastic material for each of the elastic damper elements included in the support structure. A power-unit support structure according to the present invention is for this reason capable of not only attenuating the oscillatory motions of the power unit but absorbing the vibrations which originate in the power unit per se.

What is claimed is:

1. A power unit support structure of a motorcycle having a power unit and a frame structure including a support member having a tubular end portion terminating in conjunction with said power unit, which comprises:
   an elongated swing member positioned between said power unit and said tubular end portion and having a first end thereof pivotally connected with said power unit;
   a pivot support assembly for pivotally supporting said elongated swing member on said support member; and
   an elastic damper element accommodated within said tubular end portion and coupled with a second end of said swing member.

2. A power unit support structure of a motorcycle as set forth in claim 1, in which said pivot assembly includes a bracket member secured to said support member, a pin member supported on said bracket member and extending in a lateral direction of said motorcycle, at least one elastic member coupled with the periphery of said pin member, and a sleeve member coupled on said elastic member and connected with said elongated swing member.

3. A power unit support structure as set forth in claim 1, which further comprises an additional elastic damper element provided at the pivotal connection between said first end of said swing member and said power unit.

4. A power-unit support structure as set forth in claim 1, in which said elastic damper element comprises two lug portions slightly spaced apart from each other with a gap formed therebetween and an intermediate portion which conjoins the lug portion together, each of the lug portions being held in contact with the inner peripheral surface of the tubular end portion, said swing member being held in retaining engagement at said second end thereof with said intermediate portion.

5. A power-unit support structure as set forth in claim 4, in which at least one of said lug portions is formed with a plurality of rib portions which are spaced apart from each other and which are elastically held in contact at their respective tops with the inner peripheral surface of the tubular end portion of said support member.

6. A power-unit support structure as set forth in claim 5, in which said tubular end portion is cylindrical and said rib portions have their tops located on a cylindrical surface having a center axis substantially coincident with the center axis of the tubular end portion of the support member.

7. A power-unit support structure as set forth in claim 6, in which said cylindrical surface has a predetermined diameter substantially larger than the inside diameter of the rear end portion of said support member.

8. A power-unit support structure as set forth in claim 5, in which said lug portions are spaced apart vertically from each other and in which said rib portions are spaced apart from each other substantially horizontally.

9. A power-unit support structure as set forth in claim 5, in which one of said lug portions is shaped to have a surface portion arcuately curved in cross section on said cylindrical plane, said surface portion being elastically held in contact with the inner peripheral surface of the tubular end portion of said support member.

10. A power-unit support structure as set forth in claim 9, in which said lug portions are spaced apart vertically from each other and consist of upper and lower lug portions, the upper lug portion being formed with said rib portions and the lower lug portion being shaped to have a surface portion arcuately curved in cross section said cylindrical plane, said surface portion being elastically held in contact with the inner peripheral surface of the tubular end portion of said support member.

11. A power-unit support structure as set forth in claim 1, in which said pivot support assembly comprises a rigid elongated member secured to a bracket member and having a stem portion which extends between the opposite ends of the elongated member, said rigid elongated member having a center axis providing the axis of pivotal motion of the first pivot assembly, a rigid inner support member coaxially received on said stem portion substantially throughout the length of the stem portion, a pair of cylindrical elastic damper elements coaxially received on opposite end portions, respectively, of the rigid inner tubular membmer, and a rigid outer tubular member having opposite end portions coaxially received on said cylindrical elastic damper elements, respectively, said rigid connecting means being rigidly connected between said rigid outer tubular member and a pivot assembly coupled to said power unit, said rigid arm member being rigidly connected at one end thereof to said rigid outer tubular member of said pivot support assembly.

12. A power-unit support structure as set forth in claim 1, in which a pivot assembly coupled to said power unit comprises a pair of bracket members securely attached to said power unit and formed with axial bores aligned with each other in a direction coincident with the axis of pivotal motion of the second pivot assembly, a pair of outer rigid hollow cylindrical members coaxially received in the axial bores in the bracket members, respectively, cylindrical elastic damper elements coaxially received in the outer rigid hollow cylindrical members, respectively, rigid inner cylindrical members coaxially received in the cylindrical elastic damper elements, respectively, a rigid elongated member having a stem portion extending between the opposite ends of the rigid elongated member, said rigid inner cylindrical members being disposed coaxially around opposite end portions, respectively, of the stem portion of said rigid elongated member, said stem portion being passed through the axial bores in said rigid inner cylindrical members, and a rigid outer tubular member loosely received coaxially on the stem portion of said rigid elongated member and extending between said rigid inner cylindrical members, said rigid connecting means being rigidly connected between said rigid outer tubular member and said pivot support assembly.

13. A power unit support structure as set forth in claim 2, which further comprises an additional elastic damper element provided at the pivotal connection between said first end of said swing member and said power unit.

* * * * *